July 14, 1959  J. VERHOEFF  2,894,408

SPEED-REDUCING MECHANISM

Filed July 20, 1955

INVENTOR
JACOB VERHOEFF

BY

AGENT

United States Patent Office 2,894,408
Patented July 14, 1959

2,894,408

SPEED-REDUCING MECHANISM

Jacob Verhoeff, Hilversum, Netherlands, assignor, by mesne assignments, to North American Philips Company, Inc., New York, N.Y., a corporation of Delaware Application July 20, 1955, Serial No. 523,145

Claims priority, application Netherlands August 23, 1954

2 Claims. (Cl. 74—424.8)

This invention relates to a speed-reducing mechanism between two rotatory shafts, the central lines of which extend parallel to each other, and is characterized in that one of the two shafts, which is coupled to the driving shaft during operation, comprises a single thread preferably having a small pitch and a corresponding nut, and the second shaft, which is coupled to the driven shaft during operation, comprises a multiplex thread having a large pitch and a corresponding nut, the two nuts being rigidly secured together. The speed-reducing mechanism in accordance with the invention is of simple construction and cheap to manufacture. The driving shaft may have two senses of rotation and the speed-reduction may be considerable. The mechanism may particularly be used for fine-adjustment of capacitors and other tuning elements of apparatus for use in wireless telegraphy and telephony.

A suitable form of the invention comprises a coupling member between the two shafts, which member comprises the two nuts and consists of two symmetrical parts which are separated by the plane in which the centre lines of the two sharts extend and are connected together by means of one or more springs. In this form, the two nuts are consequently as free from backlash as possible relatively to the threads of the shafts, with the result that the driven shaft is rotated immediately on reversing the movement of the driving shaft.

Figure 1:
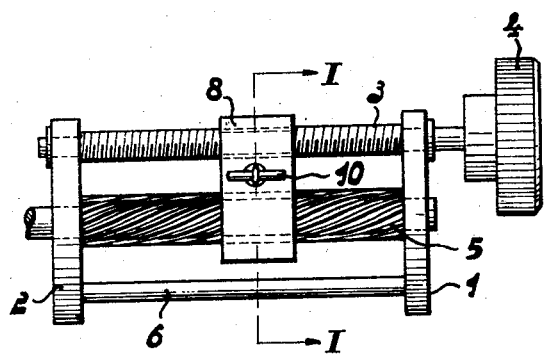
Figure 2:
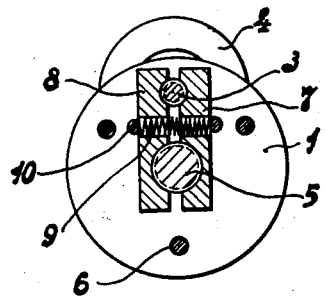

In order that the invention may be readily carried into effect, it will now be described with reference to the accompanying drawing, given by way of example, which shows one form of the invention and in which Fig. 1 is a side view of a speed-reducing mechanism and Fig. 2 is a sectional view on the line I—I of Fig. 1, viewed in the direction of the arrows.

In the drawing, two frame plates are denoted 1 and 2. In these plates is supported a shaft 3 which projects laterally from the plate 1 and carries a knob 4. The shaft 3 comprises a single thread having a small pitch. A shaft 5, which is also supported in the plates 1 and 2, projects laterally from the plate 2 and can be coupled to the shaft to be driven. The shaft 5 comprises a multiplex thread having a large pitch. The plates 1 and 2 are rigidly secured together by means of three spacers 6. Arranged between the shafts 3 and 5 is a coupling member comprising two equal parts 7 and 8. These two parts are threaded in such manner that, assembled, they constitute two rigidly connected nuts co-acting both with the thread of shaft 3 and with that of shaft 5. The parts 7 and 8 are held together by means of a draw spring 9 comprising two pins 10 to the effect of holding the parts 7 and 8 and pressing them against the threads of the shafts 3 and 5.

It will be appreciated that, on turning the knob 4, the member consisting of the halves 7 and 8 slightly moves to the left or to the right, so that the shaft 5 is set in rotation. This movement, however, is considerably slowed down relatively to the movement of shaft 3. The ratio of speed-reduction between the movement of shaft 3 and the constrained movement of shaft 5 is determined by the ratio between the pitch of the thread of shaft 3 and that of the thread of shaft 5 and, moreover, by the diameters of the shafts. The use of the two parts 7 and 8, which are drawn together by spring 9, permits the clearance between the threads and the nuts to be minimized so that the mechanism has substantially no backlash.

What is claimed is:

1. A speed reducing drive mechanism comprising a frame, two substantially parallel shafts mounted in said frame, one of said shafts being the driving shaft nad provided with a single thread, the other shaft being the driven shaft and provided with a multiplex thread, a coupling means for said two shafts including the two spaced parts, each part being provided with complementary threaded grooves in opposing surfaces of said parts whereby said shafts are positioned in the grooves of corresponding size, and means for retaining said parts in the proper spaced relationship.

2. A speed reducing drive mechanism comprising a pair of spaced plates, two substantially parallel shafts mounted in said frame, one of said shafts being the driving shaft and provided with a single thread, the other shaft being the driven shaft and provided with a multiplex thread, and means coupling said two shafts comprising two spaced parts, each part having complementary threaded groove whereby said shafts are positioned in the grooves of corresponding size, and resilient means for yieldably retaining said parts in the proper spaced relationship.

References Cited in the file of this patent

UNITED STATES PATENTS

| | | |
|---|---|---|
| 1,091,861 | Persson | Mar. 31, 1914 |
| 2,693,736 | Schumacher | Nov. 9, 1954 |